April 22, 1969 H. E. McCORMICK 3,440,122
STATIC SEAL AND METHOD OF MAKING SAME
Filed Oct. 23, 1965
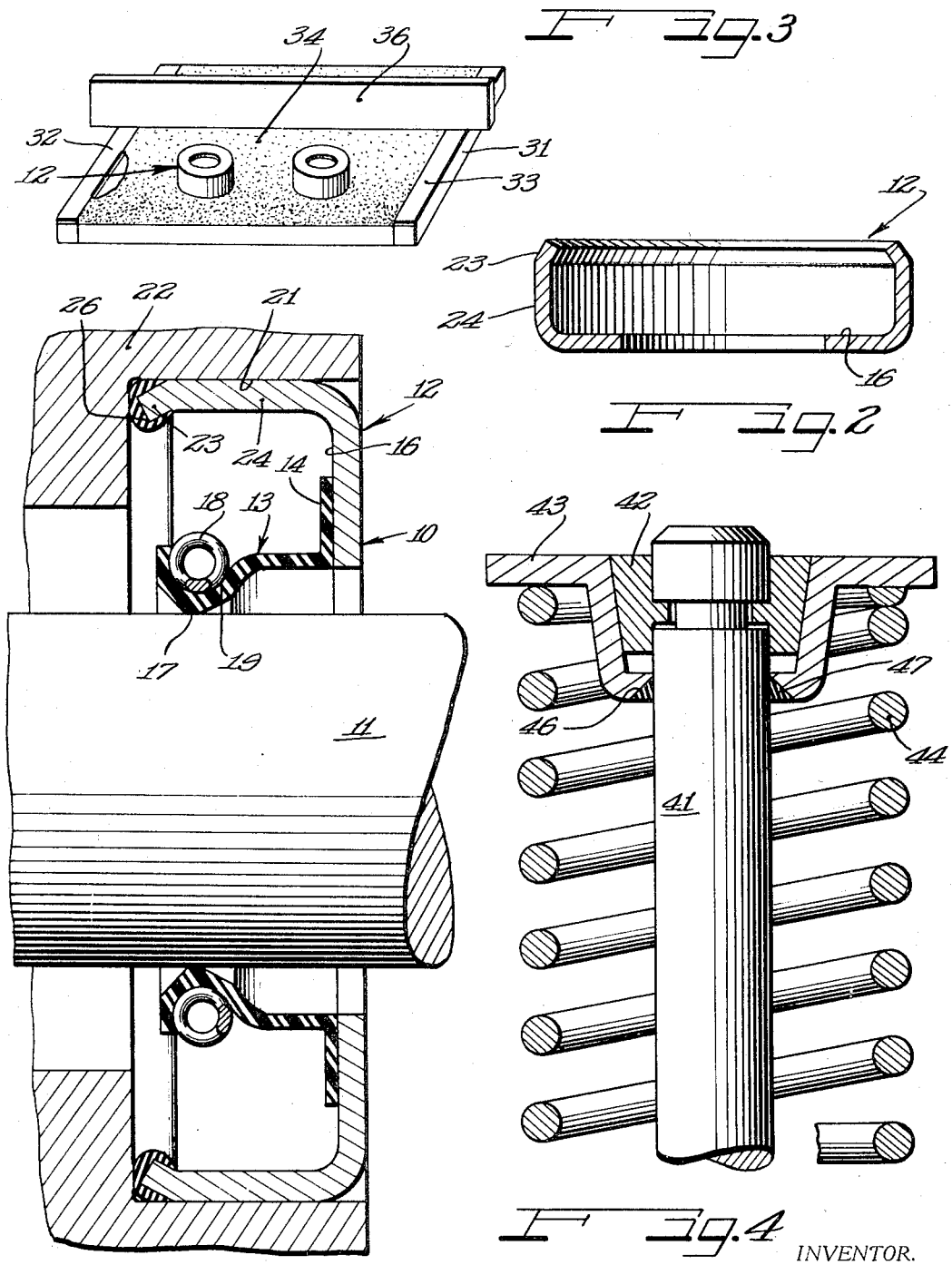
INVENTOR.
Harold E. McCormick
BY [signature] ATTORNEYS United States Patent Office 3,440,122
Patented Apr. 22, 1969

1

3,440,122
STATIC SEAL AND METHOD OF MAKING SAME
Harold E. McCormick, Ballwin, Mo., assignor to Ramsey Corporation, St. Louis, Mo., a corporation of Ohio
Filed Oct. 23, 1965, Ser. No. 503,132
Int. Cl. B44d *1/06, 1/46;* F16j *15/14*
U.S. Cl. 156—329         7 Claims

ABSTRACT OF THE DISCLOSURE

Method of forming a static seal on the periphery of a metal case of the type used as a retainer for a tetrafluoroethylene resin seal wherein the periphery of the case is coated with a thin film of a low temperature vulcanizing silicone rubber which is then permitted to form a peripheral bead, after which the beaded case is subjected to a curing temperature. In the preferred embodiment of the invention, the curing of the silicone rubber is accomplished at the same temperature as the tetrafluoroethylene sealing element in the case.

---

The present invention relates to means for providing a seal between two surfaces which are not arranged for relative movement.

Two devices in which static seals are required to prevent a transfer of fluid or gas are rotary shaft seals and valve spring keepers. In the case of a shaft seal, employing a metallic case with a shaft engaging resinous sealing element, there is a necessity of providing a seal at the outer periphery of the case and the inner wall of the bore in which the seal is pressed, in order to prevent passage of liquid between the outer periphery of the case and the wall of the bore. In the case of a poppet valve, there is a necessity of sealing the junction between the valve stem and the valve spring keeper in order to prevent leakage of oil which would follow the valve stem into the combustion chamber and cause excessive consumption of oil.

In the past, seals of this type have required the use of expensive molds and other equipment to mold a rubber seal or grommet in these areas. Furthermore, the molding techniques previously employed of necessity required the application of substantial thicknesses of rubber due to limitations in mold design, so that more rubber was actually applied than was physically needed to accomplish the sealing function. In addition, it was difficult with prior art techniques to apply such rubber seals to narrow surfaces or surfaces of irregular configuration.

One of the objects of the present invention is to provide an improved method for forming a static seal in the form of a peripheral bead, which method eliminates the necessity of employing expensive molds and parts handling equipment.

Another object of the present invention is to provide an improved method for applying thin layers of a sealant onto a metallic surface.

A further object of the invention is to provide a method for forming a peripheral bead on a metallic element which can be employed with narrow surfaces or irregular surfaces.

A further object of the invention is to provide an improved seal integrally bonded to the periphery of a metallic case.

In general, the method of the present invention comprises cleaning the peripheral surfaces of the element on which the sealing bead is to appear, applying a primer to the cleaned peripheral surfaces, dipping the primer coated surfaces into a low temperature vulcanizing silicone rubber to thereby coat the peripheral surfaces with the rubber, and curing the coated surfaces at an elevated temperature. With the method of the present invention, economies are effected in applying the rubber to the surface, and the application is considerably simplified over comparable seal forming techniques of the past.

The silicone rubber used in accordance with the present invention is one of the so-called room temperature vulcanizing rubbers. One particularly preferred material for this use is the material sold under the trademark "Silastic S-2007" by Dow Corning Corporation. This material has a specific gravity of 1.30 and a brittle point of −80° F. Its durometer reading is 35 in the vulcanized condition, and it evidences an elongation of 157%. However, there are a number of other commercially available silicone rubbers which can be used, some of which employ hydrogen peroxide as a catalyst to permit heat curing of the material. Typically, the silicone rubbers are prepared from a mixture of a dimethyl silicone polymer, an organic filler, and a vulcanizing agent. The silicone polymer is usually made by polymerization of very pure difunctional silicones. Typically, silica soot is used as an elastomer reinforcement for the product.

The primer used to bond the silicone rubber to the metallic surface is one which is compatible with the subsequently applied silicone rubber. The best results have been obtained by using a solution composed of synthetic organic silicones in a methanol solvent system, and containing no hydrocarbon solvents or oils. This type of product is marketed under the trademark "Chemlok 607" by the Hughson Chemical Company. The primer has a solids content of 11.5 to 12.5%, a specific gravity of 0.83 and a density of 6.94 pounds per gallon.

A further description of the present invention will be made in conjunction with the attached sheet of drawings which illustrate a preferred embodiment.

FIGURE 1 is a fragmentary view, partly in elevation and partly in cross-section of a shaft seal assembly embodying the principles of the present invention;

FIGURE 2 is a view in cross-section of the seal case illustrated in FIGURE 1;

FIGURE 3 is a view in perspective illustrating somewhat schematically the method in which the sealing compound is applied to the periphery of the seal case; and FIGURE 4 is an enlarged, fragmentary view of a valve stem and valve cap assembly which has been provided with a static seal in accordance with the present invention.

As shown in the drawings:

In FIGURE 1, reference numeral 10 indicates generally a shaft seal assembly arranged to sealingly engage a shaft 11. The shaft seal assembly includes a metallic case generally illustrated at reference numeral 12 carrying a flexible seal element 13 composed of a tetrafluoroethylene resin. The sealing element 13 is provided with an annular flange portion 14 which is bonded to the inner radial wall 16 of the metallic case 12. The sealing element 13 has a relatively narrow sealing lip 17 engaging the shaft. Rotary shaft seals of this type are flexible enough to accommodate shaft eccentricities and provide high lip pressures without increasing frictional torque. Most of the lip pressure comes from the seal 13 itself, and this is supplemented by means of a garter spring 18 disposed in a socket 19 formed in the sealing element 13.

The entire sealing element 10 is snugly received within a bore 21 of a housing 22. At its outer peripheral end, the seal case 12 is usually provided with an inwardly inclined end portion 23. It is important to seal the case around this area in order to prevent leakage of fluid about the outer annular wall 24 of the seal case and the bore 21. The present invention provides a particularly effective means for providing a sealing bead 26 in this area to provide a static seal between the confronting wall portions of the case and the bore.

The process of the present invention can be applied to seal assemblies in which the resinous sealing element 13 has already been cured, or which has not yet been cured. In the latter case, a seal which has been molded and bonded to the metallic case 12 is thoroughly cleaned in the vicinity of the rim 23, and approximately ⅛ of an inch below the rim on the outer diameter and inner diameter of the case wall with a degreaser such as trichloroethylene. Other grease solvents such as acetone, toluene, xylene, and various commercially available alkaline cleaners and/or anodic etching can be used to completely remove any dirt or grease adhering to the metal surfaces. Care should be taken not to immerse the resinous sealing element in the solvent as corrosion of the sealing element might result.

The next step is the application of a primer to the cleaned surfaces to provide for adherence of the subsequently applied silicone rubber. As explained previously, the primer is preferably a silicone composition which is compatible with the subsequently applied elastomer. The primer is allowed to dry in air for a minimum of 15 minutes, after which the case is ready for the application of the sealing composition.

A pair of metallic cases 12 have been illustrated in position for coating with the elastomer in FIGURE 3 of the drawings. The coating assembly may include a rigid metal base 31 across which there is disposed a pair of metal spacers 32 and 33 having a height equal to the depth of the silicone rubber which is to be applied to the cases 12. A thin film 34 of the silicone rubber is spread on the base plate 31 between the spacer bars 32 and 33, and a flat metal bar 36 is used as a squeegee to level the surface of the rubber film between the spacer bars 32 and 33. The cases 12 are then disposed with their rims 23 immersed in the silicone rubber film 34 and allowed to stand in the film for a few seconds. The cases 12 are then lifted vertically and then inverted and allowed to stand with the rims 23 standing upwardly, as illustrated in FIGURE 2. In this position, the silicone rubber has a tendency to flow slightly and to equalize the amount of rubber coating around the periphery. The surface tension is sufficiently high, however, that the rubber does not run.

Next, the seal is ready for curing. In the case of bonding an uncured tetrafluoroethylene resin sealing element to the case 12, the curing of the seal element 13 can be accomplished at the same time as the curing of the static seal bead 26. For the curing of the tetrafluoroethylene, it is necessary to exceed the gel temperature of the resin, which is on the order of 510°. Consequently, the joint curing operation can be carried out by heating the coated case to a temperature of about 510 to 550° F. After heating of the seal in the oven (the oven temperature can typically be about 540° F.) for about 10 minutes, the seal can be removed and then quenched in oil. This procedure results in providing an integrally attached bead 26 to the rim of the case, the thickness of the bead being on the order of 0.010 to 0.030 inch thick. At this thickness, there is enough rubber present to provide the seal without wasting of material.

In the event the resinous sealing element 13 has been precured before the rubber is applied, the same steps can be used in manufacturing the sealing element, except that the furnace treatment can be a lower temperature. In this case, where only the rubber remains to be cured, the coated case can be heated to a temperature of about 350 to 450° F. for a period of about 15 minutes. Then, the seal is removed as before and quenched in oil. also be employed for the manufacture of seals in difficultly accessible elements such as in the environment of a poppet valve structure of the type illustrated in FIGURE 4. In that figure, a valve stem 41 is shown secured to a retainer lock 42 disposed in a spring cap 43 which serves to bottom the valve spring 44. The nose of the spring cap 43 is chamfered as illustrated at reference numeral 46 and it is important to provide a seal between that portion of the nose and the valve stem 41 in order to prevent oil leakage into the combustion chamber. The process of the present invention is well suited for this purpose, as the spring cap 43 can be dipped into the film of silicone rubber, nose down, and then removed vertically. After removal, the valve cap is inverted and allowed to stand with the nose facing up. The chamfer in the spring cap helps to even out the distribution of the silicone rubber after application. After curing for 15 to 20 minutes at 380° F., a thoroughly bonded silicone rubber seal 47 is formed on the nose of the spring cap 43.

From the foregoing, it will be understood that the process of the present invention provides a convenient and inexpensive means for applying sealing surfaces to metal caps and the like while eliminating expensive molds and parts handling equipment. Through the use of the method of the present invention, very thin layers of rubber can be applied under controlled conditions. Furthermore, the method is useful with narrow surfaces and irregularly shaped objects which have heretofore been difficult to provide with sealing surfaces.

It should be evident that various modifications can be made to the described embodiments without departing from the scope of the present invention.

I claim as my invention:

1. The method of forming a static seal on the periphery of a metallic case carrying an uncured tetrafluoroethylene resin sealing element which comprises cleaning the peripheral areas in which the seal is to be formed, applying a primer to the cleaned areas, dipping the thus prepared case into a film of a low temperature vulcanizing silicone rubber to thereby coat said areas with said rubber, simultaneously curing said sealing element and the rubber coating by heating the thus coated case to a temperature of about 510 to 550° F., and thereafter quenching the heated assembly.

2. The method of forming a static seal on the periphery of a metallic case carrying an uncured tetrafluoroethylene resin sealing element which comprises cleaning the peripheral areas in which the seal is to be formed, applying a primer to the cleaned areas, spreading out a uniformly thin film of a low temperature vulcanizing silicone rubber, dipping the thus prepared peripheral areas into said film, lifting said case from said film so that a coating of said rubber adheres to said peripheral areas, simultaneously curing said sealing element and the rubber coating by heating the thus coated case to a temperature of about 510 to 550° F., and thereafter quenching the heated assembly.

3. The method of forming a static seal on the periphery of a metallic case carrying a cured tetrafluoroethylene resin sealing element which comprises cleaning the peripheral areas in which the seal is to be formed, applying a primer to the cleaned areas, dipping the thus prepared case into a film of a low temperature vulcanizing silicone rubber to thereby coat said areas with said rubber, heating the thus coated case to a temperature of about 350 to 450° F. to cure the rubber coating, and quenching the resulting case.

4. The method of forming a static seal on the periphery of a metallic case carrying a cured tetrafluoroethylene resin sealing element which comprises cleaning the peripheral areas in which the seal is to be formed, applying a primer to the cleaned areas, spreading out a uniformly thin film of a low temperature vulcanizing silicone rubber, dipping the thus prepared peripheral areas into said film, lifting said case from said film so that a coating of said rubber adheres to the peripheral areas, heating the thus coated case to a temperature of about 350° to 450° F. to cure the rubber coating, and quenching the resulting case.

5. The method of forming a peripheral bead on a metallic element which comprises cleaning the peripheral surfaces on which the bead is to appear, applying a primer to the cleaned surfaces, dipping the primed surfaces into a layer of low temperature vulcanizing silicone rubber, inverting said element to thereby equalize the distribution of silicone rubber along said surface, and thereafter curing the coated surfaces to rigidify the silicone rubber into a resilient seal.

6. The method of claim 5 in which said curing is carried out at a temperature of at least 350° F.

7. The method of claim 5 in which said element after curing is quenched.

References Cited

UNITED STATES PATENTS

| | | | |
|---|---|---|---|
| 2,601,337 | 6/1952 | Smith-Johannsen | 161—193 |
| 2,774,621 | 12/1956 | Kilbourne | 288—23 |
| 2,860,083 | 11/1958 | Nitzsche et al. | 156—329 |
| 2,951,721 | 9/1960 | Asp | 288—16 |
| 3,360,425 | 12/1967 | Boone | 156—329 XR |

EARL M. BERGERT, *Primary Examiner.*

M. E. McCAMISH, *Assistant Examiner.*

U.S. Cl. X.R.

277—37, 153, 184